Oct. 13, 1942.    J. P. DE ROSE    2,298,351
ADJUSTABLE SEAT SUPPORT
Filed June 28, 1940    2 Sheets-Sheet 1
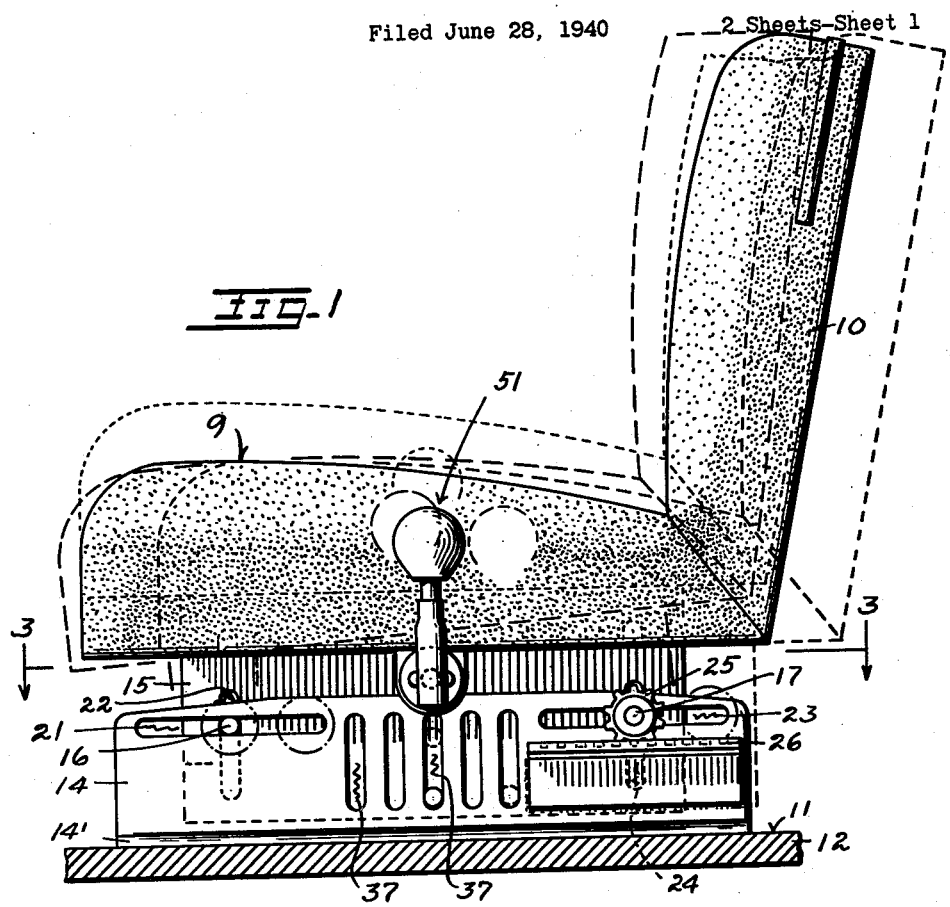
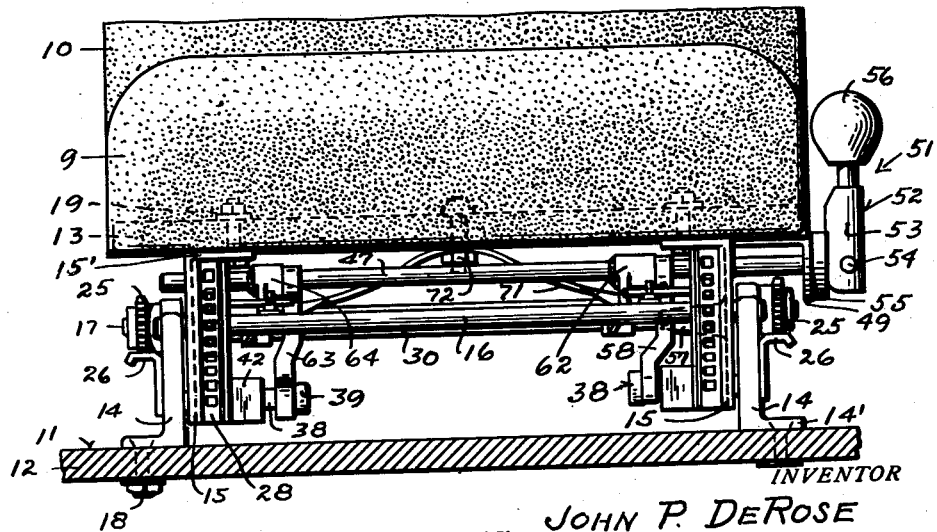
INVENTOR
JOHN P. DEROSE
BY Henry N. Young
ATTORNEY Oct. 13, 1942.　　　J. P. DE ROSE　　　2,298,351
ADJUSTABLE SEAT SUPPORT
Filed June 28, 1940　　　2 Sheets-Sheet 2
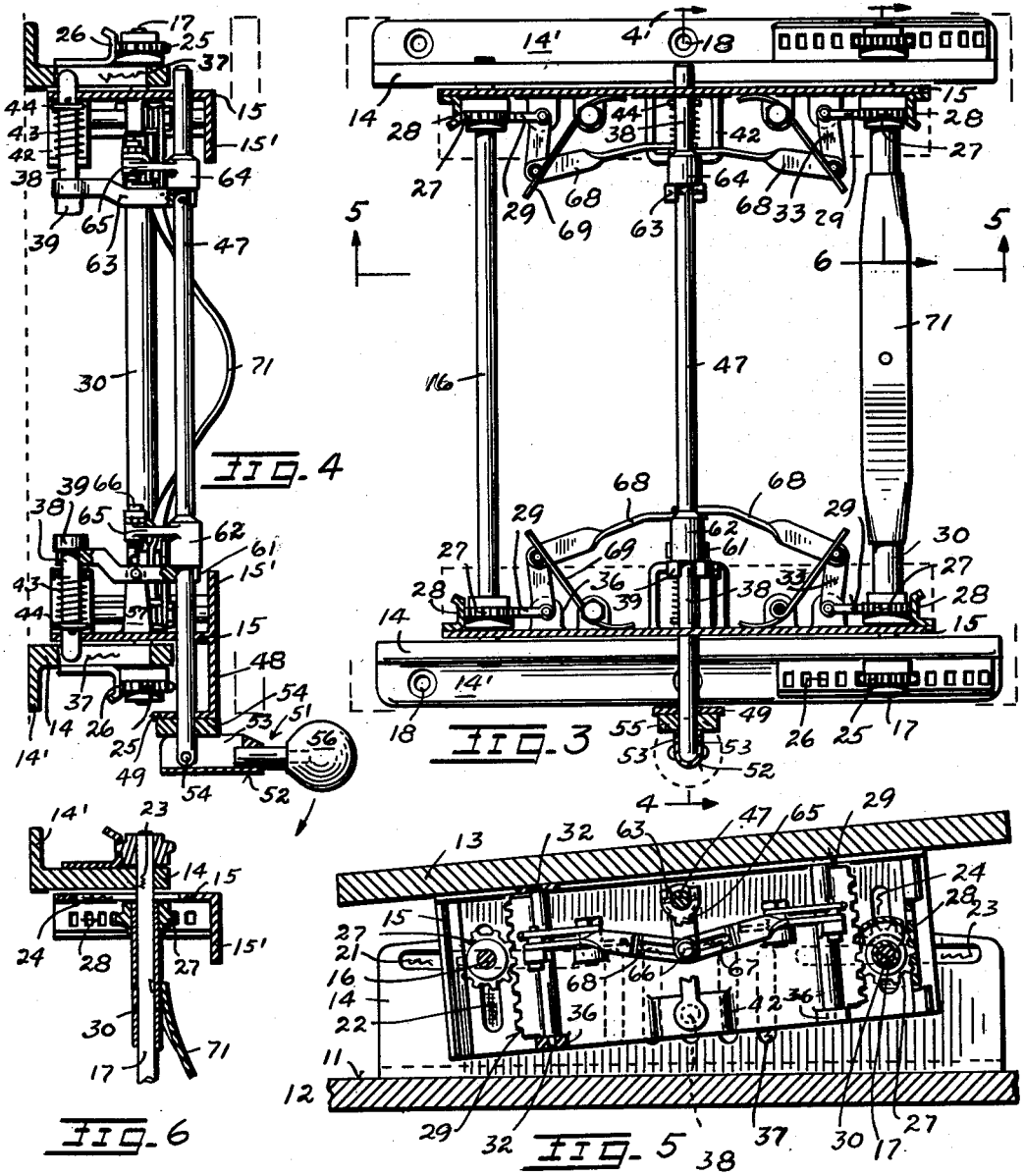
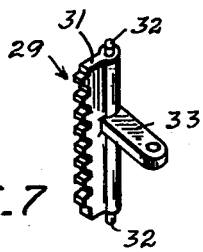
INVENTOR
JOHN P. DE ROSE
BY Henry N. Young
ATTORNEY Patented Oct. 13, 1942

2,298,351

UNITED STATES PATENT OFFICE 2,298,351

ADJUSTABLE SEAT SUPPORT

John P. De Rose, Albany, Calif.

Application June 28, 1940, Serial No. 342,997

8 Claims. (Cl. 155—14)

The invention relates to an adjustable support for a seat which is particularly designed for installation in vehicles, and embodies certain improvements over the disclosure of my U. S. Patent No. 2,179,085.

A general object is to provide a seat mounting on which the seat may be readily and independently adjusted for its height or angularity or fore-and-aft positioning with respect to the base of the mounting.

Another object is to provide the positioning control at a side of the seat and mounting, the control means comprising a single element for manipulation to selectively permit the various adjustments provided for.

The invention possesses other objects and features of advantages, some of which, with the foregoing, will be set forth or be apparent in the following description of a typical embodiment thereof, and in the accompanying drawings in which, Figure 1 is a side view of a seat unit embodying the features of present invention and mounted on a supporting floor.

Figure 2 is a front view of the assembly of Figure 1, a major portion of the seat back being broken away.

Figure 3 is a plan view of the seat mounting taken at the line 3—3 in Figure 1.

Figures 4 and 5 are sectional elevations taken respectively at lines 4—4 and 5—5 in Figure 3.

Figure 6 is a fragmentary vertical section taken at the line 6—6 in Figure 3.

Figure 7 is a perspective view of a gear-locking element of the mounting.

The features of the present invention are particularly disclosed as embodied in the structure of a seat unit which comprises a seat 9 having a back 10 and mounted on an adjustable support assembly which extends from a supporting surface 11 such as that provided by a floor 12. The present seat 9 is of a usual upholstered type having a rigid bottom plate or frame 13 for direct mounting on the adjustable support structure of the present invention. The present unit has been particularly designed for its installation in a motor-driven vehicle for use by the operator of the vehicle, though usable wherever its types of adjustment are advantageous.

Essentially, the present seat support means comprises a pair of base members 14 for fixing to the floor 12 to extend upwardly therefrom, a pair of members 15 for fixing to the seat bottom 13 to depend therefrom, and a pair of rod members 16 and 17 engaging both pairs of members 14 and 15 in a manner to support the former from the latter. The members 14 comprise rectangular plate elements provided with flanges 14' extending transversely therefrom at their bottom edges to provide floor bearings for the plates and a means by which the plates may be secured to a floor 12 in relatively fixed and mutually parallel relation, as by bolts 18. The members 15 comprise plates having transverse edge flanges 15' by which they may be secured to the seat bottom 13, as by bolts 19, in spaced parallel relation for their simultaneous disposal opposite and adjacent the mutually opposed inner faces of the plates 14.

Near their upper edges and in front portions thereof, the plate members 14 are provided with interior slots 21 which extend parallel to the base edges of the members at like distances therefrom. Adjacent their front edges, the plate members 15 are provided with similarly disposed interior slots 22 which are perpendicular to the edge of the member which abuts the seat bottom 13. The rod 16 extends through both of the pairs of slots 21 and 22 respectively provided in the members 14 and 15, said slots having uniform and like widths to permit the movement of the rod laterally thereof in the slots. Near their upper edges and in rear portions thereof, the members 14 are each provided with an interior slot 23 corresponding to their forward slots 21, and the members 15 are provided toward their rear ends with upright slots 24 corresponding to their forward upright slots 22. The rod 17 is engaged for its lateral sliding through the pairs of slots 23 and 24.

With the rods 16 and 17 engaged in the different sets of front and rear slots in the described manner, it will be understood that the seat and the members 15 thereon might be supported by the bearing of the upper ends of the slots 22 and 24 on the rods 16 and 17 respectively which are in turn supported on the bottom edges of the horizontal slots 21 and 23 of the members 14. The centers of the slots 21 and 23 have the same mutual spacing as the slots 23 and 24, whereby a fore-and-aft adjustment on the base provided by the members 14 is permitted for the members 15 and the seat.

Since any fore-and-aft adjustment of the seat is desirably equal at both seat sides (ends), means are provided to insure such equality of adjustment. As particularly illustrated, gears 25 are fixed on the extending ends of the rods 17 and constantly engage racks 26 fixed on the members 14 in parallel relation to their rear slots 23, the rod 17 being cylindrical, at least at its slot-engaging portions, to permit its rotation. In this manner, the seat is constrained to equal fore-and-aft adjustments at both sides thereof.

Means are provided to permit vertical adjustments of the seat at its front and rear, said means essentially comprising a device for releasably securing the rods 16 and 17 to the members 15 at various distances from the tops of the slots 22 and 24 respectively. As particularly shown, gears 27 are fixed on the rod 16 and on a hollow shaft 30 receiving the portion of the rod 17 between the members 15 at points adjacent the inner faces of the members 15, constantly mesh with gear racks 28 mounted on the members 15 in parallel relation to the slots 22 and 24, and are normally held against rotation as a means to fixedly space the rods from the seat bottom 13. It will be understood that like vertical adjustments of the seat at its front and/or rear when the gears are free to turn are assured by reason of the engagement of the pairs of gears 27 for the rod 16 and the tubular shaft 30 with their corresponding racks 28.

As shown, each of the gears 27 is normally locked against rotation by a stop in the form of a rack 29 for engaging a gear 27 at the opposite side thereof from its rack 28, and the appropriate stop racks 29 are arranged for their disposal out of their gear-engaging positions when an adjustment of the seat height is to be made. It will be understood that the arrangement is designed to permit mutually independent front and rear height adjustments of the seat whereby the angularity and height of the seat are both changeable with the present device.

With particular reference to the stop racks 29, it will be noted that the teeth thereof are provided at one side edge of a plate 31 having mutually aligned bearing trunnions 32 extending in a line parallel to the rack line and adjacent its other side edge, and having a lever arm 33 extending transversely from it. The trunnions 32 are engaged in bearing bores provided respectively in the flange 15' of the member 15 and projections 36 extending transversely from the member 15 near its bottom edge. The arrangement is such that the stop rack 29 may be rocked between a position in which it is engaged by the teeth of the corresponding gear 27 and a position in which it is free of the gear. When a rack 29 engages a gear 27, the member 15 is supported by and between the racks 28 and 29 through the engaged gear 27. When both stop racks 29 at either the front or rear of the seat are inoperatively disposed, the seat is freed thereat for its raising or lowering to a new position, the positioning of the stop rack 29 being controlled through a means which is operative through the arms 33 and is hereinafter described.

Means are provided for securing the seat in the fore-and-aft adjustment which is permitted by the laterally slidable bearing engagement of the rods 16 and 17 with the bottoms of the slots 21 and 23 of the base members 14, it being noted that the slots 21 and 23 comprise, in effect, parts of a single slot and might be so considered and/or provided. As particularly shown in Figures 1 and 4, the plates 14 are each provided with a similar set of upright and laterally spaced interior slots 37 intermediately of the horizontal slots 21 and 23, and similar spring bolts 38 mounted at intermediate points of the members 15 are selectively engageable in corresponding slots 37 of the plates 14 for releasably securing the seat in a desired fore-and-aft adjusted position thereof. The bolts 38 are provided near the bottom edges of the plates 15 and are slidably mounted in and between aligned bores provided in the plates and in the heads of U-brackets 42 mounted at the inner faces of the plates 15, the bolt having a head 39 which extends beyond the bracket. An helical spring 43 encircles the bolt 38 between the bracket portion receiving the bolt and a seat ring 44 fixed to the bolt for urging the operative disposal of the bolt.

It will now be noted that the release of the normally operative stop racks 29 and bolts 38 is arranged to be effected through appropriate manipulations of a rod or shaft 47 which is rotatably and slidably engaged through bearing openings provided in the plate members 15 adjacent their tops and intermediate their lengths in a line which is parallel to the rods 16 and 17. The member 15 at one side of the seat is provided with an outwardly extending bracket arm 48 in the plane of its flange 15' and provided with a down-turned portion 49 which also receives the control shaft 47 therethrough. A handle member 51 is hingedly mounted at the free end of the shaft 47 beyond the bracket portion 49, said handle normally extending upwardly opposite the adjacent seat side. A shank portion 52 of the handle comprises a member which is of channel cross-section at its lower portion, and receives the shaft end between its sides 53 to which it is hinged by a pin 54 at a point which is a less distance from the plane of the free side edges of its parts 53 than from the plane of its lower end. The slotted handle side opposite the bracket portion 49 is normally held flat against a bearing ring 55 which slidably receives the shaft and engages the part 48. The arrangement is such that an outward swinging of the handle with respect to the seat will axially displace the shaft in the same direction, the free lower corners of the shank parts 53 being rounded off to facilitate this action. A suitable handle knob 56 is mounted at the other end of the shank member 52.

It will now be noted that the described axial shifting of the shaft 47 by swinging the handle 51 outwardly is arranged to simultaneously withdraw both of the bolts 38 to permit a fore-and-aft adjustment movement of the seat on its base, and suitable connections are provided between the shaft and bolts for the purpose. As particularly shown, a bracket 57 extends inwardly from the member 15 and pivotally carries a centrally pivoted lever 58 which has one forked end 59 which receives the shank of the corresponding bolt 38 and engages the bolt head, and a fork 61 at its other end which receives the shaft 47 adjacent a sleeve 62 fixed on the shaft. An arm 63 fixed on the shaft 47 extends radially from the shaft and has its free end forked to receive the shank of the other bolt 38 and bear against the bolt head. The arrangement is such that the described swinging of the handle 51 into line with the shaft will simultaneously effect the withdrawal of both bolts 38 to free the seat for its fore-and-aft adjustment. It will be understood that the bolt springs 43 are jointly cooperative to resiliently hold either the bearing side or the free end of the handle shank 52 flat against the bearing ring 55.

The sleeve 62 and a sleeve 64 on the control shaft 47 are provided with rigid arms 65 which are normally disposed to extend downwardly from the shaft and are in mutually parallel relation. Headed pivot pins 66 extend from the outer ends of the arms 65 with their axes parallel to the shaft and are engaged in longitudinal slots 67 provided in links 68 which have their other ends pivoted to the extremities of the stop rack arms 33. The arrangement is such that a rotary rocking of the shaft 47 may simultaneously and selectively effect a gear-releasing disposal of either the front or rear pair of stop racks to thereby free the corresponding gear to permit an up or down adjustment of the seat thereat. Springs 69 are reactive between the members 15 and the outer ends of the lever arms 33 to yieldingly resist a rotation of the shaft to displace either pair of stop racks whereby to normally retain the shaft in a rotatably centered position.

In terms of the present showing in which the handle 51 is provided at the left side (end) of the seat, it will be understood that the seat may be freed for raising or lowering at its front by swinging the handle in a counter-clockwise direction to disengage the front pair of stop racks 29. On the other hand, a clockwise swinging of the handle will release the rear of the seat for its up and down adjustment. It will thus be understood that a large number of adjustments of both height and angularity may be provided and maintained with the present device.

A semi-elliptic leaf spring 71 is preferably engaged between the seat bottom 13 and the tubular shaft 30 on the rod 17 for constantly urging a lifting of the back portion of the seat with respect to the rod. As shown, the spring 71 is provided with a central perforation for its fixing to the seat bottom as by a bolt 72 and has its extremities cylindrically curved for their slidable seating upon the shaft 30.

From the foregoing description taken in connection with the accompanying drawings, the advantages of the construction and method of operation of the present seat support will be readily understood by those skilled in the art to which the invention appertains. While I have described the features and the principles of operation of a structure which I now consider to be a preferred embodiment of my invention, I desire to have it understood that the showing is primarily illustrative, and that such changes may be made, when desired, as fall within the scope of the following claims.

I claim:

1. In combination with a seat, a seat-supporting means comprising a plate member supported in upright position beneath the seat in fore-and-aft relation thereto and provided with horizontal slots in front and rear portions thereof, support elements carried by the seat and constantly engaged in the different said slots for cooperatively supporting the seat upon the plate for its fore-and-aft adjustment and means entirely on the seat providing for independent adjustments of the spacing of the operative support elements with respect to the seat whereby to adjustably vary the fore-and-aft angularity of the seat.

2. In combination with a seat, a seat-supporting means comprising a base plate member supported in upright position beneath the seat in fore-and-aft relation thereto and provided with spaced openings in front and rear portions thereof, laterally spaced support elements carried by the seat and constantly engaged in the different said openings for cooperatively supporting the seat upon the plate, and means entirely on the seat to independently adjust the spacing of a said operative support element with respect to the seat in a fixed line transverse to the seat plane whereby to adjustably vary the fore-and-aft angularity of the supported seat, at least one of said base plate openings comprising a horizontal slot to permit the required variation in the mutual spacing of the support elements as the spacing of a said element with respect to said seat is varied by said adjustment means therefor.

3. In combination with a seat, a seat-supporting means comprising a plate member supported in upright position beneath the seat in fore-and-aft relation thereto and provided with spaced openings in front and rear portions thereof, rotatable rod elements carried by the seat and constantly engaging the bottoms of the different said openings for cooperatively supporting the seat upon the plate, a gear on a said rod eleent, an upright rack on the seat constantly engaged by the gear, and means on the seat normally operative to secure the rod against rotation and releasable to permit an adjusted spacing of the rod with respect to the seat.

4. A structure in accordance with claim 3 having a spring means constantly operative between the seat and a rod element to constantly urge a separation of the seat and rod.

5. A structure in accordance with claim 3 wherein the last means comprises a second rack mounted on the seat in normal engagement with the said gear to prevent its rotation and arranged for its displacement out of its gear-engaging position.

6. A structure in accordance with claim 3 wherein the last means comprises a rack pivoted on the seat for swinging about an axis parallel to its longitudinal line and secured against longitudinal displacement and normally engaging the teeth of the gear.

7. In combination with a seat, a seat-supporting means comprising a pair of mutually spaced base members disposed beneath the seat in fore-and-aft relation thereto and provided with corresponding horizontal slots, a pair of laterally spaced support rods adjustably carried by the seat longitudinally thereof and constantly engaged in and between the said horizontal slots for cooperatively supporting the seat for its fore-and-aft adjustment, mutually independent means releasably securing said rods on said seat in adjusted spaced relation thereto, and means carried entirely by the seat for actuation to selectively release said rods for their adjustment with respect to the seat.

8. In a seat-supporting means, a base member providing a plate disposed in upright position beneath the seat in fore-and aft relation thereto and provided with a horizontal slot, a plate depending from the seat in fixed relation thereto and adjacent and transversely of the base plate and provided with an upright slot in crossing relation to the first slot, a rod member engaged through both of said slots transversely of the plates and laterally slidable in and along the slots, and means carried entirely by the seat for releasably securing the rod in variably adjusted position in the upright slot while the rod is supportedly engaged in the horizontal slot for movement therealong.

JOHN P. DE ROSE.